United States Patent
Hamaguchi et al.

(10) Patent No.: US 8,731,077 B2
(45) Date of Patent: May 20, 2014

(54) WIRELESS COMMUNICATION SYSTEM, CONTROL STATION APPARATUS AND TERMINAL APPARATUS

(75) Inventors: Yasuhiro Hamaguchi, Osaka (JP); Kazunari Yokomakura, Osaka (JP); Osamu Nakamura, Osaka (JP); Jungo Goto, Osaka (JP); Hiroki Takahashi, Osaka (JP); Toshizo Nogami, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 524 days.

(21) Appl. No.: 13/057,936

(22) PCT Filed: Jul. 9, 2009

(86) PCT No.: PCT/JP2009/062548
§ 371 (c)(1),
(2), (4) Date: Apr. 14, 2011

(87) PCT Pub. No.: WO2010/016355
PCT Pub. Date: Feb. 11, 2010

(65) Prior Publication Data
US 2011/0200071 A1    Aug. 18, 2011

(30) Foreign Application Priority Data
Aug. 8, 2008    (JP) ................... 2008-205089

(51) Int. Cl.
*H04L 27/28*    (2006.01)

(52) U.S. Cl.
USPC ........................................ 375/260

(58) Field of Classification Search
None
See application file for complete search history.

(56) References Cited

U.S. PATENT DOCUMENTS

| | | | |
|---|---|---|---|
| 2006/0114935 A1* | 6/2006 | Takano | 370/468 |
| 2007/0049218 A1 | 3/2007 | Gorokhov et al. | |
| 2007/0183380 A1 | 8/2007 | Rensburger et al. | |
| 2008/0132282 A1 | 6/2008 | Liu et al. | |
| 2009/0147748 A1 | 6/2009 | Ofuji et al. | |
| 2010/0091919 A1 | 4/2010 | Xu et al. | |

FOREIGN PATENT DOCUMENTS

| | | |
|---|---|---|
| CN | 101162982 A | 4/2008 |
| JP | 2007-151059 A | 6/2007 |
| JP | 2008-118650 A | 5/2008 |
| JP | 2008-172356 A | 7/2008 |
| WO | WO 2007/027825 A2 | 3/2007 |
| WO | WO 2007/091836 A1 | 8/2007 |
| WO | WO 2008/057969 A2 | 5/2008 |

OTHER PUBLICATIONS

International Search Report issued in International Application No. PCT/JP2009/062548 on Oct. 27, 2009.
Mashima et al., "A Study on Broadband Single Carrier Transmission Technique using Dynamic Spectrum Control," Technical Report of IEICE, The Institute of Electronics, Information and Communication Engineers, pp. 1-6, 2007.

* cited by examiner

*Primary Examiner* — Kevin Kim
(74) *Attorney, Agent, or Firm* — Birch, Stewart, Kolasch & Birch, LLP

(57) ABSTRACT

To switch among access schemes of different systems efficiently, in a wireless communication system for selecting one access scheme from among a plurality of access schemes to perform wireless communications in between a control station apparatus and a terminal apparatus, the control station apparatus notifies the terminal apparatus of an access scheme using information indirectly designating the access scheme, and the terminal apparatus selects one access scheme from among a plurality of access schemes according to the notified information to perform wireless communications with the control station apparatus.

13 Claims, 1 Drawing Sheet

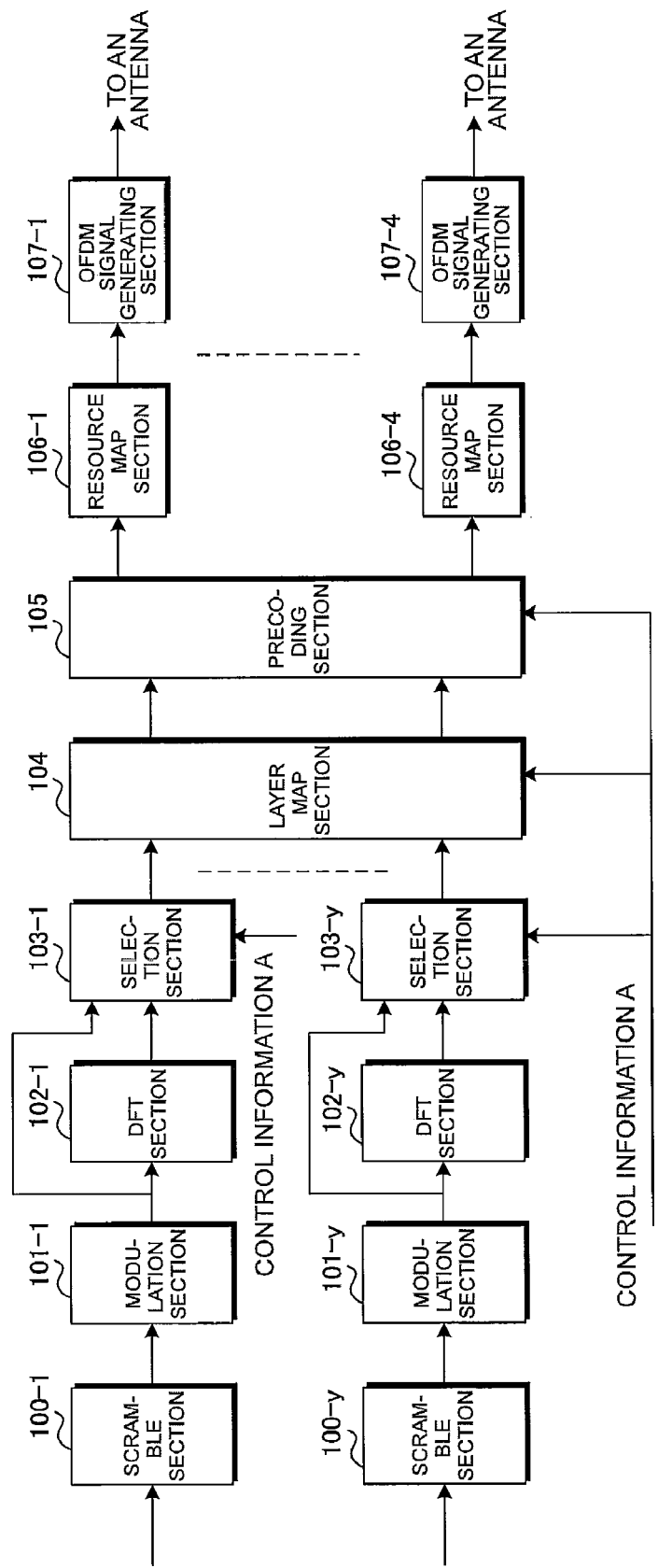

WIRELESS COMMUNICATION SYSTEM, CONTROL STATION APPARATUS AND TERMINAL APPARATUS

TECHNICAL FIELD

The present invention relates to techniques for selecting a single access scheme from among a plurality of access schemes to perform wireless communications in between a control station apparatus and a terminal apparatus.

BACKGROUND ART

Recently, standardization has started to converge in the LTE (Long Term Evolution) system that is the 3.9G cellular telephone wireless communication system, and further, standardization has started in LTE-A (LTE-Advance, also referred to as "IMT-A") that is the 4G wireless communication system further evolved from the LTE system. In LTE-A, further improvements are desired in transmission efficiency targeted for low-mobility users. In the LTE system, it is already determined that the single-user MIMO (Multi-Input Multi-Output) technique is adopted in downlink (communications from the base station apparatus to terminal apparatus), and in LTE-A, it is proposed to further increase the number of antennas, and thereby improve transmission efficiency.

Meanwhile, in uplink, with importance placed on loads of the high power amplifier (hereinafter, referred to as "HPA") of the terminal apparatus, adopted as a communication scheme was DFT-S-OFDM (Discrete Fourier Transform Spread Orthogonal Frequency Division Multiplexing) with good PAPR (Peak to Average Power Ratio) characteristics. Then, adoption of single-user MIMO was postponed with increases in power consumption feared.

In the LTE-A system, it is expected that the MIMO technique will be adopted also in uplink to aim at improvements in transmission efficiency, and it is proposed to apply an OFDM (Orthogonal Frequency Division Multiplexing) system when MIMO is used. As the reason, it is considered that when the OFDM system is used, the maximum likelihood decision method called MLD (Maximum likelihood Detection) can be used with a feasible computation amount, and that best reception performance is obtained.

Further, Patent Documents 1 and 2 disclose examples of switching between access schemes. More specifically, proposed is a method of switching between OFDM that is of typical multicarrier signal and DFT-S-OFDM (described as "SC-FDM" in the documents) of single-carrier signal. Furthermore, as a criterion by which to switch, it is proposed that power headroom (hereinafter, referred to as "PH") to saturation power in the HPA is used as a criterion value and switch between access schemes based on the criterion value.

Patent Document 1: Japanese Unexamined Patent Publication No. 2007-151059
Patent Document 2: International Publication No. WO/2008057969 Pamphlet

DISCLOSURE OF INVENTION

Problems to be Solved by the Invention

However, for example, switching between OFDM and DFT-S-OFDM according to the PH as shown in Patent Document 2 means that switching is performed concurrently with transmission power control. In such a switching method, it is possible to respond to relatively slow time variations in the propagation channel, but it is not ease to respond to fast time variations that occur on a frame-by-frame basis, and there is a problem that it is difficult to perform efficient switching.

The present invention was made in view of such circumstances, and it is an object of the invention to provide a wireless communication system, control station apparatus and terminal apparatus for enabling access schemes of different systems to be switched efficiently.

Means for Solving the Problem (1) To attain the above-mentioned object, the invention took measures as described below. In other words, a wireless communication system of the invention is a wireless communication system for selecting one access scheme from among a plurality of access schemes to perform wireless communications in between a control station apparatus and a terminal apparatus, and is characterized in that the control station apparatus notifies the terminal apparatus of an access scheme using information indirectly designating the access scheme, and that the terminal apparatus selects one access scheme from among a plurality of access schemes according to the notified information to perform wireless communications with the control station apparatus.

Thus, the control station apparatus notifies the terminal apparatus of an access scheme using information indirectly designating the access scheme, the terminal apparatus selects one access scheme from among a plurality of access schemes according to the notified information, and it is thereby possible to switch among access schemes of different systems efficiently.

(2) Further, in the wireless communication system of the invention, it is a feature that the control station apparatus notifies the terminal apparatus of rank information indicating the number of streams that can concurrently be transmitted, and that the terminal apparatus selects one access scheme from among a plurality of access schemes according to the notified rank information to perform wireless communications with the control station apparatus.

Thus, since the control station apparatus notifies the terminal apparatus of the rank information indicating the number of streams that can concurrently be transmitted, and the terminal apparatus selects one access scheme from among a plurality of access schemes according to the notified rank information, by associating the rank with the access scheme, the need for defining a number of precoding methods is eliminated, and it is possible to reduce the control information amount. As a result, it is possible to perform communications efficiently.

(3) Furthermore, in the wireless communication system of the invention, it is a feature that the control station apparatus notifies the terminal apparatus of number-of-antenna information indicating the number of antennas to use, and that the terminal apparatus selects one access scheme from among a plurality of access schemes according to the notified number-of-antenna information to perform wireless communications with the control station apparatus.

Thus, since the control station apparatus notifies the terminal apparatus of the number-of-antenna information indicating the number of antennas to use, and the terminal apparatus selects one access scheme from among a plurality of access schemes according to the notified number-of-antenna information, it is not necessary to set all the access schemes with respect to each rank and each number of antennas, and it is possible to perform efficient switching of the access scheme. Further, the access scheme can be determined in consideration of the number of antennas, and it is thereby possible to aim at power saving in the terminal apparatus. Furthermore, since the access scheme is notified using the information indirectly designating the access scheme, it is possible to reduce the control information amount.

(4) Still furthermore, in the wireless communication system of the invention, it is a feature that the control station apparatus notifies the terminal apparatus of transmission diversity information indicating a type of transmission diversity, and that the terminal apparatus selects one access scheme from among a plurality of access schemes according to the notified transmission diversity information to perform wireless communications with the control station apparatus.

Thus, since the control station apparatus notifies the terminal apparatus of the transmission diversity information indicating the type of transmission diversity, and the terminal apparatus selects one access scheme from among a plurality of access schemes according to the notified transmission diversity information, by associating the type of transmission diversity with the access scheme, it is not necessary to define the access scheme for each type of transmission diversity, and it is possible to perform efficient switching of the access scheme. By this means, it is possible to perform switching of the access scheme in response to communication conditions.

(5) Moreover, in the wireless communication system of the invention, it is a feature that the transmission diversity information includes information for identifying whether a method of transmission diversity to use is an open loop or a closed loop.

Thus, the transmission diversity information includes the information for identifying whether a method of transmission diversity to use is an open loop or a closed loop, and it is thereby possible to perform switching of the access scheme in response to communication conditions.

(6) Further, in the wireless communication system of the invention, it is a feature that the control station apparatus notifies the terminal apparatus of information indicating whether or not MIMO (Multi-Input Multi-Output) transmission is single-user MIMO, and that the terminal apparatus selects one access scheme from among a plurality of access schemes according to the notified information of the MIMO transmission method to perform wireless communications with the control station apparatus.

Thus, the control station apparatus notifies the terminal apparatus of the information indicating whether or not MIMO transmission is single-user MIMO, the terminal apparatus selects one access scheme from among a plurality of access schemes according to the notified information of the MIMO transmission method to perform wireless communications with the control station apparatus, and it is thereby possible to switch among access schemes of different systems efficiently.

(7) Furthermore, in the wireless communication system of the invention, it is a feature that the control station apparatus performs the notification using a precoding matrix.

Thus, the notification is performed using the precoding matrix, and therefore, when the transmission side is capable of recognizing conditions of the propagation channel, it is possible to perform coding among transmission antennas so as to maximize gain of a result of combining on the reception side.

(8) Still furthermore, in the wireless communication system of the invention, it is a feature that the control station apparatus notifies the terminal apparatus of frequency information indicating a frequency to use, and that the terminal apparatus selects one access scheme from among a plurality of access schemes according to the notified frequency information to perform wireless communications with the control station apparatus.

Thus, since the control station apparatus notifies the terminal apparatus of frequency information indicating a frequency to use, and the terminal apparatus selects one access scheme from among a plurality of access schemes according to the notified frequency information, by associating a frequency allocation method with the access scheme, the need for defining the access scheme for each of frequency allocation methods is eliminated, and it is possible to perform efficient switching of the access scheme. Further, the control station apparatus does not need to notify the terminal apparatus of the access scheme, and it is thereby possible to reduce the control information amount.

(9) Moreover, in the wireless communication system of the invention, it is a feature that the frequency information includes information indicating whether or not frequencies to use have consecutiveness.

Thus, the frequency information includes the information indicating whether or not frequencies to use have consecutiveness, and therefore, by associating the frequency allocation method with the access scheme, it is not necessary to define the access scheme for each of frequency allocation methods, and it is possible to perform efficient switching of the access scheme.

(10) Further, in the wireless communication system of the invention, it is a feature that the plurality of access schemes is at least two of DFT-S-OFDM (Discrete Fourier Transform Spread Orthogonal Frequency Division Multiplexing), OFDM (Orthogonal Frequency Division Multiplexing), and Clustered DFT-S-OFDM (DFT-S-OFDM with Spectrum Division Control or Clustered SC-FDMA).

Thus, a plurality of access schemes is at least two of DFT-S-OFDM, OFDM and Clustered DFT-S-OFDM, and it is thereby possible to switch among a plurality of access to perform communications.

(11) Further, a control station apparatus of the invention is a control station apparatus for selecting one access scheme from among a plurality of access schemes to perform wireless communications with a terminal apparatus, and is characterized by notifying the terminal apparatus of an access scheme, using one of rank information indicating the number of streams that can concurrently be transmitted, number-of-antenna information indicating the number of antennas to use, transmission diversity information indicating a type of transmission diversity, and frequency information indicating a frequency to use.

Thus, the terminal apparatus is notified of the access scheme using one of the rank information indicating the number of streams that can concurrently be transmitted, number-of-antenna information indicating the number of antennas to use, transmission diversity information indicating a type of transmission diversity, and frequency information indicating a frequency to use, and it is thereby possible to switch among access schemes of different systems efficiently.

(12) Moreover, a terminal apparatus of the invention is a terminal apparatus for selecting one access scheme from among a plurality of access schemes to perform wireless communications with a control station apparatus, and is characterized by selecting one access scheme from among a plurality of access schemes according to one of rank information indicating the number of streams that can concurrently be transmitted, number-of-antenna information indicating the number of antennas to use, transmission diversity information indicating a type of transmission diversity, and frequency information indicating a frequency to use each notified from the control station apparatus, and performing wireless communications with the control station apparatus.

Thus, the terminal apparatus selects one access scheme from among a plurality of access schemes to perform wireless communications with a control station apparatus, selects one access scheme from among a plurality of access schemes according to one of the rank information indicating the number of streams that can concurrently be transmitted, number-of-antenna information indicating the number of antennas to use, transmission diversity information indicating a type of transmission diversity, and frequency information indicating a frequency to use each notified from the control station apparatus, and is thereby capable of switching among access schemes of different systems efficiently.

Advantageous Effect of the Invention

According to the invention, the control station apparatus notifies the terminal apparatus of an access scheme using the information indirectly designating the access scheme, the terminal apparatus selects one access scheme from among a plurality of access schemes according to the notified information, and it is thereby possible to switch among access schemes of different systems efficiently.

BRIEF DESCRIPTION OF DRAWING

FIG. 1 is a block diagram illustrating a schematic configuration of a transmission apparatus applied to a terminal apparatus according to Embodiments.

DESCRIPTION OF SYMBOLS

100-1~100-$y$ Scramble section
101-1~101-$y$ Modulation section
102-1~102-$y$ DFT section
103-1~103-$y$ Selection section
104 Layer map section
105 Precoding section
106-1~106-4 Resource map section
107-1~107-4 OFDM signal generating section

BEST MODE FOR CARRYING OUT THE INVENTION

Embodiments according to the invention will specifically be described below with reference to drawings. In the Embodiments, as switching among access schemes, used are OFDM as a typical multicarrier system, DFT-S-OFDM as a typical single-carrier system, and Clustered DFT-S-OFDM (referred to as C-SC, specifically described later) having intermediate characteristics between the multicarrier system and single-carrier system. In the Embodiments, it is described that these systems are different access schemes, but it is possible to define the systems as different communication systems, and both of the ways of thinking are included in the scope of the invention. In addition, it is also possible to consider DFT-S-OFDM a subset (part) of DFT-S-OFDM.

In addition, in the Embodiments, the number of streams that can concurrently be transmitted is referred to as Rank. Further, the information used to notify of the Rank is referred to as a Rank Indicator (RI). In each of the Embodiments, it is assumed that a plurality of terminal apparatuses concurrently accesses to a base station using different frequencies in uplink, but the invention is not limited thereto. Furthermore, a unit to access is referred to as a resource block (RB). It is assumed that the resource block is comprised of two or more consecutive subcarriers. Moreover, the base station constitutes the control station apparatus, and a mobile station constitutes the terminal apparatus.

Embodiment 1

In Embodiment 1, the access scheme is notified using Rank of MIMO. In this Embodiment, it is assumed that the number of transmission antennas used in a terminal apparatus is "4", i.e. the maximum transmission-capable Rank is "4", and that the number of reception antennas of a reception apparatus on the base station side is "4". The number of reception antennas on the base station side is "4" in this Embodiment, but is not limited thereto, as long as signals of four or more streams can be divided. Further, this Embodiment assumes the case of using consecutive subcarriers or consecutive RBs.

This Embodiment shows an example of switching between access schemes using the Rank of the propagation channel. The access schemes to switch are OFDM and DFT-S-OFDM. In determining the Rank, the Rank is determined based on the eigenvalue of the propagation channel matrix, quality (SNR: Signal to Noise power Ratio) of the propagation channel, etc. and this Embodiment shows the case of determining the Rank only using the quality of the propagation channel. In determining the quality, the base station receives SRS (Sounding Reference Signal) that is a known reference signal transmitted from each terminal apparatus, and determines the Rank.

Next (Table 1) is a table showing the Rank associated with SNR.

TABLE 1

| SNR (x dB) | Rank |
|---|---|
| X > X1 | 4 |
| X1 > x > X2 | 3 |
| X2 > x > X3 | 2 |
| X3 > x | 1 |

In Table 1, X1 to X4 are thresholds to determine the Rank from the SNR, and the relationship of X1>X2>X3 is assumed to be satisfied.

Table 2 is a table showing the access scheme associated with the Rank.

TABLE 2

| Rank | Access Scheme |
|---|---|
| 4 | OFDM |
| 3 | OFDM |
| 2 | OFDM |
| 1 | DFT-S-OFDM |

The characteristic element of this Embodiment in Table 2 is that OFDM is not selected as an access scheme for Rank 1, and that DFT-S-OFDM that is a different access scheme is selected. This is because it is determined that LTE-A should maintain backward compatibility with LTE i.e. LTE-A certainly supports DFT-S-OFDM, and defining OFDM for Rank 1 in this case results in a plurality of transmission modes of Rank 1. By this means, it is not necessary to define OFDM of Rank 1, and efficient switching is made possible. Further, since the base station does not need to notify the terminal apparatus of the access scheme, it is possible to contribute to reductions of control data.

In the case of performing selection of the Rank as shown in Table 1 and selection of the access scheme by the Rank as shown in Table 2, DFT-S-OFDM with good PAPR characteristics is used in the region with low SNR calculated from the SRS signal i.e. in the region requiring high transmission power, and it is also possible to obtain the effect similar to the switching criterion as shown in Patent Document 2 secondarily.

FIG. 1 is a block diagram illustrating a schematic configuration of a transmission apparatus applied to the terminal apparatus according to this Embodiment. In addition, to simply the description, FIG. 1 shows minimum blocks required to explain the invention. In FIG. 1, y blocks are indicated in "100" to "103". This means that it is possible to multiplex y different physical channels concurrently. In other words, it can be considered a unit to perform error correcting and retransmission control that is not described in FIG. 1.

The scramble sections 100-1 to 100-y scramble data to add randomness to the data or to add the confidentially of the data. Modulation sections 101-1 to 101-y perform modulation for QPSK, etc. DFT sections 102-1 to 102-y perform DFT on a plurality of items of data. Selection sections 103-1 to 103-y select outputs of the DFT sections 102-1 to 102-y or outputs of the modulation sections 101-1 to 101-y using control information A.

The control information A is determined by the Rank notified from the base station. In this Embodiment, the information A is a signal to select the outputs of the modulation sections 101-1 to 101-y when the Rank information is "2" to "4", while being a signal to select the outputs of the DFT sections 102-1 to 102-y when the Rank information is "1". In addition, in the following description, to simplify the description, y=1 is assumed.

A layer map section 104 converts input data s (i) into data dn(i) of (n+1) layer(s) (in this Embodiment, n=0, 1, 2, 3). Herein, it is assumed that the layer is the same as the Rank number when the Rank is "2" or more, while being the same as the number of antennas when the Rank is "1". Equation (1) indicates the relationship between s and d for each Rank.

[Equation 1]

$$\begin{array}{l}
\text{Rank 4} \begin{cases} d^0(i) = s(4i) \\ d^1(i) = s(4i+1) \\ d^2(i) = s(4i+2) \\ d^3(i) = s(4i+3) \end{cases} \\
\text{Rank 3} \begin{cases} d^0(i) = s(3i) \\ d^1(i) = s(3i+1) \\ d^2(i) = s(3i+2) \end{cases} \\
\text{Rank 2} \begin{cases} d^0(i) = s(2i) \\ d^1(i) = s(2i+1) \end{cases} \\
\text{Rank 1} \begin{cases} d^0(i) = s(i) \\ d^1(i) = s(i) \\ d^2(i) = s(i) \\ d^3(i) = s(i) \end{cases}
\end{array} \quad (1)$$

In Equation (1), which equation is used is determined by the Rank information input by the control information A.

A precoding section 105 has the function of performing precoding to acquire the diversity effect among antenna streams. In this Embodiment, when the Rank is "3" or less, coding is performed to acquire the diversity effect. Further, as the transmission diversity, the description is made using CDD (Cyclic Delay Diversity) as an example that is one of transmission diversities of open loop without requiring advance information.

Assuming an output of the precoding section 105 to be gn(i), Equation (2) indicates the relationship between dn(i) and gn(i) for each Rank.

[Equation 2]

$$\begin{array}{l}
\text{Rank 4} \begin{cases} g^0(i) = d^0(i) \\ g^1(i) = d^1(i) \\ g^2(i) = d^2(i) \\ g^3(i) = d^3(i) \end{cases} \\
\text{Rank 3} \begin{cases} g^0(i) = d^0(i) \\ g^1(i) = d^1(i) \\ g^2(i) = d^2(i) \\ g^3(i) = \dfrac{d^0(i) + d^1(i) + d^2(i)}{\sqrt{3}} \times e^{-j2\pi \times i/2} \end{cases} \\
\text{Rank 2} \begin{cases} g^0(i) = d^0(i) \\ g^1(i) = d^1(i) \\ g^2(i) = d^0(i) \times e^{-j2\pi \times i/2} \\ g^3(i) = d^1(i) \times e^{-j2\pi \times i/2} \end{cases} \\
\text{Rank 1} \begin{cases} g^0(i) = d^0(i) \\ g^1(i) = d^1(i) \times e^{-j2\pi \times i/m} \\ g^2(i) = d^2(i) \times e^{-j2\pi \times 2i/m} \\ g^3(i) = d^3(i) \times e^{-j2\pi \times 3i/m} \end{cases}
\end{array} \quad (2)$$

With respect to CDD of Rank 1, since the access scheme is DFT-S-OFDM, division by natural number m contained in the exponential part of phase rotation in equation 1 of Rank 1 is inserted to delay the cycle. An appropriate value of m is preferably determined corresponding to the number of subcarriers and/or the number of RBs to use, but may be set at a higher value in advance. Further, which equation is used is determined by the Rank information input by the control information A.

Resource map sections 106-1 to 106-4 map the precoded data to subcarriers of OFDM to use. Then, OFDM signal generating sections 107-1 to 107-4 generate OFDM signals, and outputs the signals from respectively connected antenna ports. The reason why four same blocks exist is that four transmission antennas are assumed.

As described above, by associating the Rank with the access scheme as shown in Embodiment 1, it is not necessary to define a number of precoding methods. As a result, since it is possible to reduce the control information amount, communications can be performed with efficiency.

In Embodiment 1 as described above, the case of using consecutive subcarriers and RBs is assumed. However, to further improve signal transmission characteristics, it is preferable to consider the frequency selective diversity effect (where each terminal apparatus selects subcarriers and RBs with good quality). The DFT-S-OFDM signal uses consecutive subcarriers and RBs. Accordingly, in the case of selecting subcarriers and RBs used in an OFDM signal optionally, when the access scheme is switched, it is necessary to switch the subcarriers and RBs to use. In other words, it is necessary to concurrently perform switching timing of the access scheme and switching of use of frequency resources.

As a method of arranging DFT-S-OFDM in the frequency domain optionally, the method called Clustered DFT-S-OFDM is proposed. For Clustered DFT-S-OFDM, the same technique is referred to as various names such as Clustered SC-FDMA, DFT-S-OFDM with Spectrum Division Control, Dynamic Spectrum Control DFT-S-OFDM, etc. In this description, hereinafter, the technique is referred to as "C-SC".

This Clustered DFT-S-OFDM is a method of grouping a plurality of subcarriers and RBs in the frequency domain in generating a DFT-S-OFDM signal and assigning to frequency regions in the unit of grouping. As the unit of grouping is made finer, the flexibility is increased in arrangement, but there is a problem that PAPR characteristics deteriorate. However, PAPR characteristics do not become worse than in an OFDM signal with the same number of subcarriers. In C-SC, by assigning consecutive subcarriers and RBs, since the signal is the same as the DFT-S-OFDM signal, this system can be defined as a system having high compatibility with DFT-S-OFDM. Table 3 is a table showing the access scheme associated with the Rank. Herein, shown is the case of switching between the OFDM signal and the C-SC signal corresponding to the Rank.

TABLE 3

| Rank | Access Scheme |
| --- | --- |
| 4 | OFDM |
| 3 | OFDM |
| 2 | OFDM |
| 1 | C-SC |

The merit with respect to Table 2 is that signals can be arranged relatively flexibly in the frequency domain as described previously. Further, since C-SC is compatible with DFT-S-OFDM, the same transmission diversity method and the like can be set. Accordingly, in a communication area requiring good PAPR characteristics e.g. in a cell edge area requiring high-output signals, by assigning consecutive subcarriers and RBs to C-SC, it is possible to use DFT-S-OFDM signals.

Only the arrangement of RBs is different between DFT-S-OFDM and C-SC. In other words, DFT-S-OFDM is considered a subset (one use example) of C-SC. Accordingly, by controlling the arrangement of RBs in the control station apparatus, although not explicitly in Table 3, it is possible to select DFT-S-OFDM as an access scheme. Accordingly, Table 3 is considered including the configuration of Table 2. When this consideration is shown as a Table, the description is as shown in Table 4.

TABLE 4

| Rank | Access Scheme |
| --- | --- |
| 4 | OFDM |
| 3 | OFDM |
| 2 | OFDM |
| 1 | C-SC |
|   | DFT-S-OFDM |

The configuration of the transmitter is the same as that shown in FIG. 1, and a resource map section 106 assigns data to the frequency region designated by the base station. In this Embodiment, the number of antennas is constant (four) irrespective of the Rank, but in uplink communications that is transmission from the terminal apparatus, the number of transmission antennas is preferably low from the viewpoint of power consumption. Accordingly, it is possible to further vary the number of antennas corresponding to the Rank. In other words, by notifying of the number of transmission antennas as a substitute for notification of the Rank, the same effect can be exerted.

Embodiment 2

In Embodiment 2, access schemes OFDM, DFT-S-OFDM and C-SC are switched according to conditions of diversity. In this Embodiment, it is assumed that the number of transmission antennas used in a terminal apparatus is "2" i.e. the maximum transmission-capable Rank is "2", and that the number of reception antennas of a reception apparatus on the base station side is "2". The number of reception antennas on the base station side is "2" in this Embodiment, but is not limited thereto, as long as signals of two or more streams can be divided.

This Embodiment shows an example of switching the access scheme corresponding to the method of transmission diversity, specifically, whether the diversity is an open loop (OPTxD) or closed loop (CLTxD). The access schemes to switch are OFDM, and DFT-S-OFDM (or C-SC).

The transmission diversity of open loop is transmission diversity used in the case that the transmission side cannot recognize propagation channel conditions on the reception side. Meanwhile, in the closed loop, the transmission side recognizes propagation channel conditions on the reception side, and performs processing adapted to the propagation channel, and thus, the closed loop is of a method enabling transmission diversity gain to be more improved. Table 5 is a table showing the access scheme associated with the method of transmission diversity.

TABLE 5

| Transmission Diversity | Rank | Access Scheme |
| --- | --- | --- |
| OPTxD | 2 | DFT-S-OFDM (C-SC) |
|  | 1 | DFT-S-OFDM (C-SC) |
| CLTxD | 2 | OFDM |
|  | 1 | OFDM |

The characteristic element of this Embodiment in Table 5 is that OFDM is not selected as an access scheme for OPTxD, and that DFT-S-OFDM is not selected for CLTxD inversely. By this means, it is not necessary to define the access scheme for each method of transmission diversity, and efficient switching is made possible. For example, a high-speed user is required to select only OPTxD, and even when a rapid increase in the transmission power occurs in high-speed moving, since DFT-S-OFDM with good PAPR characteristics is selected, it is possible to control the possibility of signal distortion to within a low level. Further, the base station does not need to notify the terminal apparatus of the access scheme as in Embodiment 1, and it is thereby possible to contribute to reductions of control data. Also as shown in Table 3, the region of DFT-S-OFDM is assumed to be C-SC, and as in Embodiment 1, it is possible to process as a DFT-S-OFDM signal when necessary.

Thus, by switching the access scheme by transmission diversity, it is possible to switch between access schemes simply in response to conditions. Table 4 also describes the Rank, but shows the case that the Rank is not associated particularly in selecting the access scheme.

The configuration of the transmitter is the same as that shown in FIG. 1, and the control information A is determined by the method of transmission diversity. In addition, it is necessary to input the Rank information to the layer map section and the precoding section. Further, since two transmission antennas are assumed, sections 106 and 107 have 106-1 and 106-2, and 107-1 and 107-2.

Further, it is determined that LTE-A uses DFT-S-OFDM supported in LTE. In newly considering the MIMO system on such an assumption and further considering MIMO (MU-MIMO: referred to as Multi-User MIMO) in which different users gain access concurrently, it is preferable to assume MIMO capable of supporting DFT-S-OFDM signals. Meanwhile, it is said in the MIMO system that using OFDM signals improves characteristics by devising the configuration of the receiver. Accordingly, when a single terminal performs MIMO (SU-MIMO: referred to as Single-User MIMO), it is preferable to use MIMO-OFDM as much as possible.

Accordingly, to meet such requirements, it is considered that the access schemes are set as shown in Table 6. In addition, to restrict so that users of completely two modes do not use the same RB, the control station needs to restrict use of RB.

TABLE 6

| Transmission Diversity | Rank | Access Scheme |
|---|---|---|
| MU-MIMO | 2 | DFT-S-OFDM (C-SC) |
| SU-MIMO | 2 | OFDM |

In the normal system, there are few cases of explicitly notifying of whether to use MU-MIMO or SU-MIMO. Accordingly, to actualize this Embodiment, SU-MIMO is selected when MIMO of Rank 2 is designated using a single control data unit, and the access scheme by MU-MIMO is selected when MIMO is designated as a result of using two different control data units. When the Rank is "1", the access scheme beforehand set separately is selected. For example, when the access scheme of the Rank 2 is DFT-S-OFDM, OFDM is selected only in Rank 2 of SU-MIMO.

Embodiment 3

In Embodiment 3, the access scheme is switched in TxD among MIMO-OFDM, DFT-S-OFDM and C-SC by the Rank of MIMO and the number of transmission antennas. In this Embodiment, it is assumed that the maximum number of transmission antennas used in a terminal apparatus is "4" i.e. the maximum transmission-capable Rank is "4", and that the number of reception antennas of a reception apparatus on the base station side is "4". The number of reception antennas on the base station side is "4" in this Embodiment, but is not limited thereto, as long as signals of four or more streams can be divided.

This Embodiment shows an example of switching among access schemes using the Rank of the propagation channel and the number of antennas used in transmission. The access schemes to switch are OFDM, C-SC and DFT-S-OFDM.

Table 7 is a table showing the access scheme associated with Rank and the number of antennas. This table does not define Rank 3.

TABLE 7

| Rank | The number of Antennas | Access Scheme |
|---|---|---|
| 4 | 4 | OFDM |
| 2 | 2 | OFDM |
| 1 | 1 | C-SC |
| 1 | 2 | DFT-S-OFDM |

The feature of this Embodiment shown by Table 7 is that the access scheme is selected from the Rank and the number of antennas. There are cases that the access schemes are different in the same Rank (the fourth row and the fifth row in the Table), and that the access schemes are different in the same number of antennas (the third row and the fifth row in the Table). By this means, it is not necessary to set all the access schemes with respect to each Rank and each number of antennas, and it is possible to make efficient switching among the access schemes. Further, since the access scheme is determined also in consideration of the number of antennas, it is possible to greatly contribute to power saving in the terminal apparatus. As in Embodiments 1 and 2, the base station does not need to notify the terminal apparatus of the access scheme, and it is thereby possible to contribute to reductions of control data.

The configuration of the transmitter is the same as that shown in FIG. 1, and the control information A is determined by the Rank and the number of antennas. In addition, the Rank information needs to be input to the layer map section and the precoding section.

In addition, in Embodiments 1 and 3, the access scheme with good PAPR characteristics is selected in the low Rank state. This is because the quality of the propagation channel is normally supposed to be hostile in the low Rank state, it is expected there are many cases of needing to increase the transmission power, and therefore, selecting the access scheme with low PAPR has the significance. This Embodiment shows the case of controlling the access scheme using the Rank and the number of antennas, and it is also possible to match the Rank with the number of antennas, or control only using the number of antennas.

Embodiment 4

In Embodiment 4, the access schemes are switched between OFDM and DFT-S-OFDM according to the RB allocation method. In this Embodiment, it is assumed that the number of transmission antennas used in a terminal apparatus is "2" i.e. the maximum transmission-capable Rank is "2", and that the number of reception antennas of a reception apparatus on the base station side is "2". The number of reception antennas on the base station side is "2" in this Embodiment, but is not limited thereto, as long as signals of two or more streams can be divided.

This Embodiment shows an example of switching the access scheme according to allocations of subcarriers or RBs (allocation of frequency resources). The access schemes to switch are OFDM (or C-SC) and DFT-S-OFDM. Table 8 is a table showing the access scheme associated with the allocations of subcarriers or RBs.

TABLE 8

| Allocations of Subcarriers (RBs) | Rank | Access Scheme |
|---|---|---|
| Non-consecutive (control information to notify of non-consecutive allocations is used) | 2 | OFDM (C-SC) |
| | 1 | OFDM (C-SC) |

TABLE 8-continued

| Allocations of Subcarriers (RBs) | Rank | Access Scheme |
| --- | --- | --- |
| Consecutive (control information to notify of consecutive allocations is used) | 2<br>1 | DFT-S-OFDM<br>DFT-S-OFDM |

The characteristic element of this Embodiment in Table 8 is that DFT-S-OFDM is not selected when allocations of frequency resources are non-consecutive, and that OFDM (C-SC) is not selected when allocations are consecutive inversely. By this means, it is not necessary to define the access scheme for each allocation of frequency resources, and efficient switching is made possible. As in Embodiments 1 and 2, the base station does not need to notify the terminal apparatus of the access scheme, and it is thereby possible to contribute to reductions of control data.

Herein, allocations of frequency resources are non-consecutive or consecutive in the actual arrangement, but are not limited thereto. Generally, the base station notifies the terminal apparatus of the allocation of frequency resources. In the method of notification, there is a case of using different control signal formats between the case of notifying of non-consecutive frequency resources, and the case of notifying of consecutive frequency resources. In such a case, instead of consecutiveness in the actual arrangement, by determining the access scheme according to which format is used to notify, it is possible to obtain the same effect.

For example, in LTE, as a format of the control signal (DCI: Downlink Control Information), there are Format 0 for assigning consecutive bands, and Format 2 enabling discrete assignment. Format 1 is the downlink assignment information in LTE, and by preparing such a format in uplink (supposing "Format 0'"), the access scheme is varied by whether the band to use is notified by Format 0 or Format 0'. By such processing, it is also possible to select the access scheme irrespective of the actual arrangement.

The configuration of the transmitter is the same as that shown in FIG. 1, and the control information A is determined by the frequency resources allocation and the format of the control signal for notifying of frequency resources. In addition, it is necessary to input the Rank information to the layer map section and the precoding section. Further, since two transmission antennas are assumed, sections 106 and 107 have 106-1 and 106-2, and 107-1 and 107-2. The Table shown in this Embodiment also describes the Rank, but indicates the case where the Rank is not associated particularly in selecting the access scheme.

Embodiment 5

In Embodiment 5, PMI is used in notifying of the access scheme. Embodiment 1 shows the case of using simple CDD as a method of precoding. The CDD is an effective method as transmission diversity when conditions of the propagation channel on the reception side are unknown on the transmission side, but when the transmission side is capable of recognizing conditions of the propagation channel on the reception side to some extent, it is not said that the CDD is an advisable method to obtain sufficient transmission diversity gain.

In the case where the transmission apparatus is capable of understanding conditions of the propagation channel, a method of coding among transmission antennas is proposed so as to increase gain of a result of combining on the reception side as much as possible. In this Embodiment, a matrix used in coding is referred to as a precoding matrix (PM). This coding uses a frequency response of the propagation channel when the propagation channel is completely known, and from limitations in the control information amount, the actual system adopts a method of preparing a plurality of PMs to select from among the PMs.

When three different streams (S1, S2, S3) are transmitted from four antennas (a1, a2, a3, a4), the PM is the first matrix of the right-hand side of Equation (3).

$$\begin{pmatrix} a1 \\ a2 \\ a3 \\ a4 \end{pmatrix} = \begin{pmatrix} h11 & h12 & h13 \\ h21 & h22 & h23 \\ h31 & h32 & h33 \\ h41 & h42 & h43 \end{pmatrix} \begin{pmatrix} S1 \\ S2 \\ S3 \end{pmatrix} \quad (3)$$

In this case, the PM is a matrix with 4 rows and 3 columns. In generally, when an H×P PM is set, it can be identified that the number of transmission antennas is H and that the number of data streams i.e. the Rank is G. Embodiments 1 to 4 show the cases where the Rank is directly transmitted from the base station, and when the PM or PMI (PM indicator) indicative of the PM is thus notified, it is also possible to determine from the PM and PMI (in this Embodiment, the Rank is determined from the number of columns.)

For example, the base station and the terminal apparatus share the correspondence table of the PM and PMI as shown in Table 9, the base station notifies of the PMI, and the terminal apparatus selects the PM based on the notified PMI, and generates a transmission signal based on the selected PM. Herein, the PM when the PMI is "0" and "1" is the PM when the Rank is "1", and the PM when the PMI is "2" and "3" is the PM when the Rank is "2".

TABLE 9

| PMI | PM |
| --- | --- |
| 0 | $\frac{1}{\sqrt{2}}\begin{bmatrix} 1 \\ 1 \end{bmatrix}$ |
| 1 | $\frac{1}{\sqrt{2}}\begin{bmatrix} 1 \\ -1 \end{bmatrix}$ |
| 2 | $\frac{1}{2}\begin{bmatrix} 1 & 1 \\ 1 & -1 \end{bmatrix}$ |
| 3 | $\frac{1}{2}\begin{bmatrix} 1 & 1 \\ j & -j \end{bmatrix}$ |
| 4 | $\frac{1}{\sqrt{12}}\begin{bmatrix} 1 & 1 & 1 \\ 1 & -1 & 1 \\ 1 & 1 & -1 \\ -1 & -1 & -1 \end{bmatrix}$ |
| 5 | $\frac{1}{\sqrt{12}}\begin{bmatrix} 1 & 1 & 1 \\ 1 & -1 & 1 \\ j & j & -j \\ -j & -j & -j \end{bmatrix}$ |
| 6 | $\frac{1}{4}\begin{bmatrix} 1 & 1 & 1 & 1 \\ 1 & -1 & 1 & -1 \\ 1 & 1 & -1 & -1 \\ 1 & -1 & -1 & 1 \end{bmatrix}$ |
| 7 | $\frac{1}{4}\begin{bmatrix} 1 & 1 & 1 & 1 \\ 1 & -1 & 1 & -1 \\ j & j & -j & -j \\ j & -j & -j & j \end{bmatrix}$ |

At this point, for example, it is possible to use Table 10 as a substitute for Table 2.

TABLE 10

| PMI | Access Scheme |
|---|---|
| 6~7 | OFDM |
| 4~5 | OFDM |
| 2~3 | OFDM |
| 0~1 | DFT-S-OFDM |

Further, Embodiment 3 shows the example where the number of antennas to use is directly transmitted from the base station, and when the PMI indicative of the PM is thus notified, it is also possible to determine from the PMI. In addition, in the case of this Embodiment, the number of antennas is determined from the number of rows of the PM. For example, the base station and the terminal apparatus share the correspondence table of the PM, PMI and RI as shown in Table 11, the base station notifies of the PMI and RI, and the terminal apparatus selects the PM based on the notified PMI and RI, and generates a transmission signal using the selected PM. Herein, the PM when the RI is "1" and PMI is "0" and "1" is the PM in the case of a single antenna, and the PM in the cases of the other combinations is the PM in the case of two antennas.

TABLE 11

| | PM | |
|---|---|---|
| PMI | RI = 1 | RI = 2 |
| 0 | $\begin{bmatrix} 1 \\ 0 \end{bmatrix}$ | $\frac{1}{\sqrt{2}} \begin{bmatrix} 1 & 0 \\ 0 & 1 \end{bmatrix}$ |
| 1 | $\begin{bmatrix} 0 \\ 1 \end{bmatrix}$ | $\frac{1}{2} \begin{bmatrix} 1 & 1 \\ 1 & -1 \end{bmatrix}$ |
| 2 | $\frac{1}{\sqrt{2}} \begin{bmatrix} 1 \\ 1 \end{bmatrix}$ | $\frac{1}{2} \begin{bmatrix} 1 & 1 \\ j & -j \end{bmatrix}$ |
| 3 | $\frac{1}{\sqrt{2}} \begin{bmatrix} 1 \\ -1 \end{bmatrix}$ | — |
| 4 | $\frac{1}{\sqrt{2}} \begin{bmatrix} 1 \\ j \end{bmatrix}$ | — |
| 5 | $\frac{1}{\sqrt{2}} \begin{bmatrix} 1 \\ -j \end{bmatrix}$ | — |

At this point, for example, the access scheme is determined using Table 12.

TABLE 12

| RI | PMI | Access Scheme |
|---|---|---|
| 2 | 0~3 | OFDM |
| 1 | 2~5 | OFDM |
| 1 | 0~1 | DFT-S-OFDM |

In addition, when notification is made using a format such that an invalid value such as "0" is inserted in a row or column of the PM, the Rank should be determined in consideration of only valid value.

As described above, according to this Embodiment, the control station apparatus notifies the terminal apparatus of an access scheme using the information indirectly designating the access scheme, and the terminal apparatus selects one access scheme from among a plurality of access schemes according to the notified information. Meanwhile, when notification is made using a format such that an invalid value such as "0" is inserted in a row or column of the PM, the Rank should be determined in consideration of only valid values.

As described above, according to the Embodiments, the control station apparatus notifies the terminal apparatus of an access scheme using the information indirectly designating the access scheme, the terminal apparatus selects one access scheme from among a plurality of access schemes according to the notified information, and it is thereby possible to switch among access schemes of different systems efficiently.

The invention claimed is:

1. A control station apparatus that performs wireless communication with a terminal apparatus, the control station apparatus comprising:
a processor configured to generate communication scheme information that indirectly designates one communication scheme of a plurality of communication schemes for performing wireless communications between the control station apparatus and the terminal apparatus; and
a transmitter configured to notify the terminal apparatus of the communication scheme information,
wherein the plurality of communication schemes includes at least two of Discrete Fourier Transform Spread Orthogonal Frequency Division Multiplexing (DFT-S-OFDM), Single Carrier Frequency Division Multiple Access (SC-FDMA), Orthogonal Frequency Division Multiplexing (OFDM), Clustered DFT-S-OFDM, DFT-S-OFDM with Spectrum Division Control, and Clustered SC-FDMA.

2. The control station apparatus according to claim 1, wherein the communication scheme information is frequency information indicating a frequency to use.

3. The control station apparatus according to claim 1, wherein the communication scheme information includes information indicating whether or not frequencies to use have consecutiveness.

4. The control station apparatus according to claim 1, wherein the communication scheme information is rank information indicating the number of streams that can concurrently be transmitted.

5. The control station apparatus according to claim 1, wherein the communication scheme information is number-of-antenna information indicating the number of antennas to use.

6. The control station apparatus according to claim 1, wherein the communication scheme information is transmission diversity information indicating a type of transmission diversity.

7. The control station apparatus according to claim 6, wherein the transmission diversity information includes information for identifying whether a method of transmission diversity to use is an open loop or a closed loop.

8. The control station apparatus according to claim 1, wherein the communication scheme information is information indicating whether or not MIMO (Multi-Input Multi-Output) transmission is single-user MIMO.

9. The control station apparatus according to claim 4, wherein the transmitter is configured to notify the communication scheme information using a precoding matrix.

10. A terminal apparatus that performs wireless communication with a control station apparatus, the terminal apparatus comprising:

a receiver configured to receive, from the control station apparatus, an communication scheme information that indirectly designates one communication scheme of a plurality of communication schemes for performing wireless communications between the control station apparatus and the terminal apparatus; and a processor configured to set one communication scheme of the plurality of communication schemes for performing wireless communications based on the received communication scheme information, wherein the plurality of communication schemes includes at least two of Discrete Fourier Transform Spread Orthogonal Frequency Division Multiplexing (DFT-S-OFDM), Single Carrier Frequency Division Multiple Access (SC-FDMA), Orthogonal Frequency Division Multiplexing (OFDM), Clustered DFT-S-OFDM, DFT-S-OFDM with Spectrum Division Control, and Clustered SC-FDMA.

11. A wireless communication system comprising:
a control station apparatus; and
a terminal apparatus, wherein
the control station apparatus comprises:
   a processor configured to generate communication scheme information that indirectly designates one communication scheme of a plurality of communication schemes for performing wireless communications between the control station apparatus and the terminal apparatus; and
   a transmitter configured to notify the terminal apparatus of the communication scheme information,
the terminal apparatus comprises:
   a receiver configured to receive, from the control station apparatus, the communication scheme information; and
   a processor configured to set one communication scheme of the plurality of communication schemes based on the received communication scheme information,
wherein the plurality of communication schemes includes at least two of Discrete Fourier Transform Spread Orthogonal Frequency Division Multiplexing (DFT-S-OFDM), Single Carrier Frequency Division Multiple Access (SC-FDMA) Orthogonal Frequency Division Multiplex (OFDM), Clustered DFT-S-OFDM DFT-S-OFDM with Spectrum Division Control, and Clustered SC-FDMA.

12. A method used in a control station apparatus, the method comprising:
generating communication scheme information that indirectly designates one communication scheme from among a plurality of communication schemes for performing wireless communications between the control station apparatus and a terminal apparatus;
notifying the terminal apparatus of the communication scheme information,
wherein the plurality of communication schemes includes at least two of Discrete Fourier Transform Spread Orthogonal Frequency Division Multiplexing (DFT-S-OFDM), Single Carrier Frequency Division Multiple Access (SC-FDMA), Orthogonal Frequency Division Multiplexing (OFDM), Clustered DFT-S-OFDM, DFT-S-OFDM with Spectrum Division Control, and Clustered SC-TDMA.

13. A method used in a terminal apparatus, the method comprising:
receiving, from a control station apparatus, an communication scheme information that indirectly designates one communication scheme of a plurality of communication schemes for performing wireless communications between the control station apparatus and the terminal apparatus; and
setting one communication scheme of the plurality of communication schemes for performing wireless communications based on the received communication scheme information
wherein the plurality of communication schemes includes at least two of Discrete Fourier Transform Spread Orthogonal Frequency Division Multiplexing (DFT-S-OFDM), Single Carrier Frequency Division Multiple Access (SC-FDMA), Orthogonal Frequency Division Multiplexing (OFDM), Clustered DFT-S-OFDM, DFT-S-OFDM with Spectrum Division Control, and Clustered SC-FDMA.

* * * * *